(12) United States Patent
Tanno et al.

(10) Patent No.: US 8,950,453 B2
(45) Date of Patent: Feb. 10, 2015

(54) PNEUMATIC TIRE

(75) Inventors: Atsushi Tanno, Hiratsuka (JP); Hiroshi Fujii, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 575 days.

(21) Appl. No.: 13/126,004

(22) PCT Filed: Oct. 8, 2009

(86) PCT No.: PCT/JP2009/067577
§ 371 (c)(1),
(2), (4) Date: Apr. 26, 2011

(87) PCT Pub. No.: WO2010/050351
PCT Pub. Date: May 6, 2010

(65) Prior Publication Data
US 2011/0198005 A1    Aug. 18, 2011

(30) Foreign Application Priority Data

Oct. 31, 2008  (JP) .................................. 2008-282106

(51) Int. Cl.
*B60C 11/117*  (2006.01)
*B60C 11/03*   (2006.01)

(52) U.S. Cl.
CPC ........... *B60C 11/032* (2013.01); *B60C 11/0318* (2013.01)
USPC ............... 152/209.17; 152/209.2; 152/209.19

(58) Field of Classification Search
USPC .................. 152/209.2, 209.3, 209.17, 209.19
See application file for complete search history.

(56) References Cited

U.S. PATENT DOCUMENTS

| | | | | |
|---|---|---|---|---|
| 1,411,671  A  * | 4/1922 | Schrank | .................... | 152/209.17 |
| 4,327,792  A  * | 5/1982 | Landers | .................... | 152/209.2 |
| 4,945,966  A  * | 8/1990 | Ogawa | .................... | 152/209.19 |
| 5,591,280  A  * | 1/1997 | Asano | .................... | 152/209.22 |
| 2006/0157179 A1 * | 7/2006 | Bito et al. | .................... | 152/209.19 |

FOREIGN PATENT DOCUMENTS

| | | | |
|---|---|---|---|
| DE | 4426950 | * | 2/1996 |
| EP | 0612631 | * | 8/1994 |
| EP | 0788899 | * | 8/1997 |
| JP | 62-006802 | * | 1/1987 |
| JP | 63-291704 | * | 11/1988 |

(Continued)

OTHER PUBLICATIONS

English machine translation of JP08-238911, no date.*

(Continued)

*Primary Examiner* — Steven D Maki
*Assistant Examiner* — Robert Dye
(74) *Attorney, Agent, or Firm* — Global IP Counselors, LLP (57) ABSTRACT

A pneumatic tire is provided with a large number of holes that are arranged in the tire's circumferential direction. These holes are provided in land portions that are provided in both shoulder sections of a tread. The land portions can have different pitch lengths. Each of the holes has formed there inside a projection having an upper end with a flat surface or a convex surface. The distance between the outer wall of the projection at the upper end thereof and the inner wall of the hole is set in the range from 1 to 5 mm. The upper end of the projection is located at a position below the opening of the hole.

17 Claims, 5 Drawing Sheets

(56) References Cited

FOREIGN PATENT DOCUMENTS

| | | | |
|---|---|---|---|
| JP | 8-48113 A | | 2/1996 |
| JP | 8-118918 A | | 5/1996 |
| JP | 08-238911 | * | 9/1996 |
| JP | 9-150608 A | | 6/1997 |
| JP | 9-175120 A | | 7/1997 |
| JP | 2001-138715 | * | 5/2001 |
| JP | 2004-90766 A | | 3/2004 |
| JP | 2006-168571 A | | 6/2006 |
| JP | 2007-269144 A | | 10/2007 |
| JP | 2008-74346 A | | 4/2008 |
| KR | 2003059596 | * | 7/2003 |

OTHER PUBLICATIONS

English machine translation of JP2001-138715, no date.*
English machine translation of KR2003059596, no date.*
English machine translation of EP0788899, no date.*
English machine translation of JP2006-168571, no date.*
English translation of JP62-006802, dated Jan. 1987.*
English translation of JP63-291704, dated Nov. 1988.*

* cited by examiner

PNEUMATIC TIRE

CROSS-REFERENCE TO RELATED APPLICATIONS

This U.S. National stage application claims priority under 35 U.S.C. §119(a) to Japanese Patent Application No. 2008-282106, filed in Japan on Oct. 31, 2008, the entire contents of which are hereby incorporated herein by reference.

TECHNICAL FIELD

The present invention relates to a pneumatic tire, and more specifically to a pneumatic tire configured to prevent stone retention in small holes provided in a land portion in a shoulder region of a tread surface for reduction of road noise.

BACKGROUND ART

When a rolling tire is caused to vibrate by irregularities on a road surface, the vibration is transmitted to the vehicle cabin through suspensions, and further vibrates the ceiling, floor, and the like of the vehicle cabin. A resonance sound generated by resonance of air inside the vehicle cabin due to the vibration is referred to as road noise.

A conventional pneumatic tire is disclosed in Japanese patent application Kokai publication No. 2004-90766. Specifically, to a shoulder section of a tread of a pneumatic tire mounted on a wheel, at which the vibration transmission ratio to an axle side is largest, many small holes are arranged in the circumferential direction of the tire. The many small holes reduce the stiffness of a tread rubber to thereby improve the vibration absorption performance of the tire so that the road noise can be reduced. However, since small stones and the like on a road surface are likely to be retained in the many small holes provided to the tread during driving, there is a problem that when the small holes are clogged with such small stones, the tread surface is damaged, and hence the durability of the tire is deteriorated.

SUMMARY

To solve the above-described problem, an object of the present invention is to provide a pneumatic tire which has many small holes provided to a land portion in a shoulder region of a tread surface in order to reduce road noise, and which is configured to prevent stone retention in the small holes, and thereby to improve the durability.

A pneumatic tire of the present invention to achieve the above-described object is a pneumatic tire, in which a plurality of lug grooves each extending in a width direction of the tire are arranged in each of both shoulder sections of a tread surface at a pitch variable in a circumferential direction of the tire, and in which many small holes are provided in a plurality of land portions defined by the lug grooves, the small holes being aligned in the circumferential direction of the tire, wherein a projection having an upper end with a flat surface or a convex surface is formed inside each of the small holes, a distance between an outer wall of an upper end portion of the projection and an inner wall of the small hole is set to 1 to 5 mm, and the upper end of the projection is positioned lower than an opening of the small hole.

Moreover, the above-described configuration is preferably configured as described in the following (1) to (8):

(1) The area of an annular portion formed between the outer wall of the upper end portion of each of the projections and the inner wall of a corresponding one of the small holes is set to 3 to 50 mm$^2$, and the depth of each of the small hole is set to 40 to 100% of an maximum depth of the lug grooves.

(2) A vertical depth from a surface of each of the land portions to the upper end of a corresponding one of the projections is set to 1.0 to 5.0 mm.

(3) A cross-sectional shape of the upper end portion of each of the projections in a radial direction of the tire is semi-circular.

(4) A bottom surface of each of the small holes is inclined with respect to the tread surface, and is shallower on an outer side in the width direction of the tire than an inner side in the width direction of the tire.

(5) A shape of the opening of each of the small holes is circular or elliptical in a plan view.

(6) A ratio a/b of a major diameter a to a minor diameter b of the elliptical shape is $1<a/b \leq 1.5$.

(7) A distance d by which an inner edge of the opening of each of the small holes is away from an outer lateral edge of a corresponding one of the land portions satisfies a relationship $d \geq D/4$ with respect to a diameter D of the circular small hole, or a relationship $d \geq b/4$ with respect to the minor diameter b of the elliptical small hole.

(8) Among the land portions, a land portion having a larger pitch length has a larger number of the small holes provided thereto while a land portion having a smaller pitch length has a smaller number of the small holes provided thereto.

According to the present invention, the projection having the upper end with the flat surface or the convex surface is formed inside each of the small holes in the pneumatic tire, in which the multiple land portions are defined at a pitch variable in the circumferential direction of the tire by the multiple lug grooves which are arranged in each of both shoulder sections of the tread surface and each of which extends in the width direction of the tire, and in which the many small holes are aligned in the multiple land portions in the circumferential direction of the tire so that the road noise can be suppressed. Hence, the projection acts to push back a small stone which would otherwise enter the small hole, so that stone retention in the small hole can be prevented. In addition, the distance between the outer wall of the upper end portion of the projection and the inner wall of the small hole is set to 1 to 5 mm. Hence, the tread stiffness can be sufficiently reduced even when the projection is provided to suppress the stone retention, and the road noise is thereby suppressed. Moreover, since the upper end of the projection is positioned lower than the opening of the small hole, chipping of the projection can be prevented, so that the durability can be improved.

DETAILED DESCRIPTION OF THE EMBODIMENTS

Figure 1:
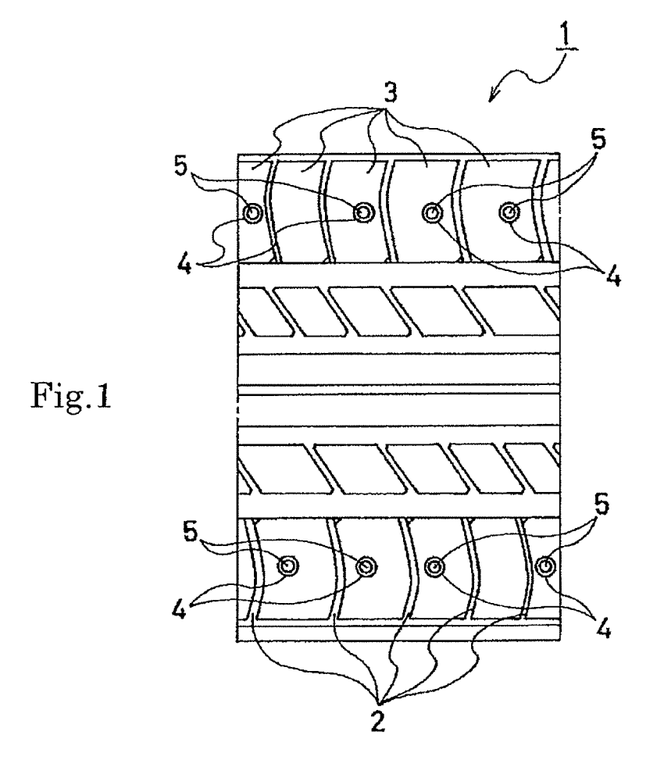
FIG. 1 is a plan view of a tread surface of a pneumatic tire according to an embodiment of the present invention.

FIG. 1 is a front view of a tread surface of a pneumatic tire according to an embodiment of the present invention. In FIG. 1, lug grooves 2 each extending in the width direction of the tire are formed in each shoulder section of a tread 1 at a pitch variable in the circumferential direction of the tire. By the lug grooves 2, multiple kinds of land portions 3 with different pitch lengths are formed to be arranged in the circumferential direction of the tire. Of these multiple kinds of land portions 3, at least land portions 3 having large pitch lengths are provided with small holes 4. These small holes 4 are arranged at predetermined intervals in the circumferential direction of the tire. The arrangement of the small holes 4 is not limited to the single row as shown in the drawing, but may be two or more rows. A projection 5 is formed inside each of the small holes 4 formed in the land portions 3. Since the tread stiffness of each shoulder section of the tread 1 is reduced by providing the small holes 4 in the shoulder section as described above, the vibration is absorbed and reduced, so that the transmission of the vibration to the wheel side is suppressed. For this reason, the road noise can be reduced.

When the small holes 4 are provided in a row to the land portions 3 in the shoulder section as described above, the road noise can be suppressed by reducing effectively the tread stiffness, but there is a problem that these small holes 4 are likely to retain stones on a road surface. However, since the projection 5 is formed inside each small hole 4 in the tire of the present invention, the projection 5 shows an effect of preventing stones from entering, and the retention of a stone into the small hole 4 is prevented.

Figure 2:
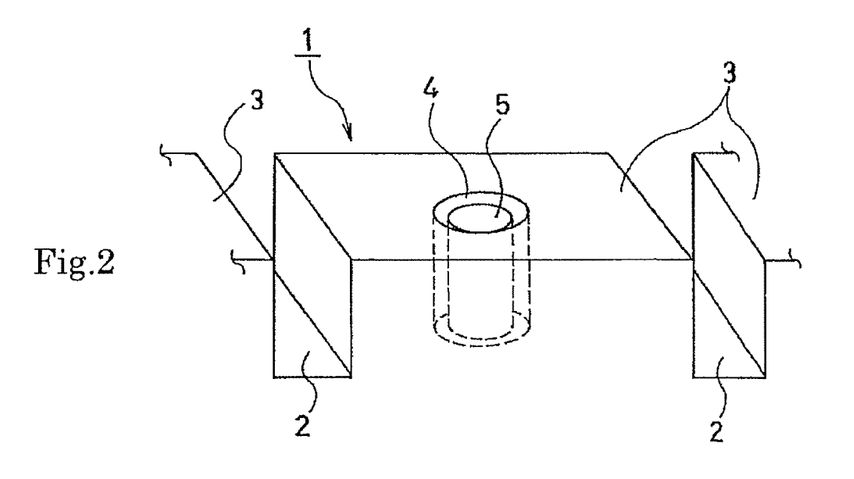
FIG. 2 is a perspective view of a land portion of the pneumatic tire of FIG. 1.
Figure 3:
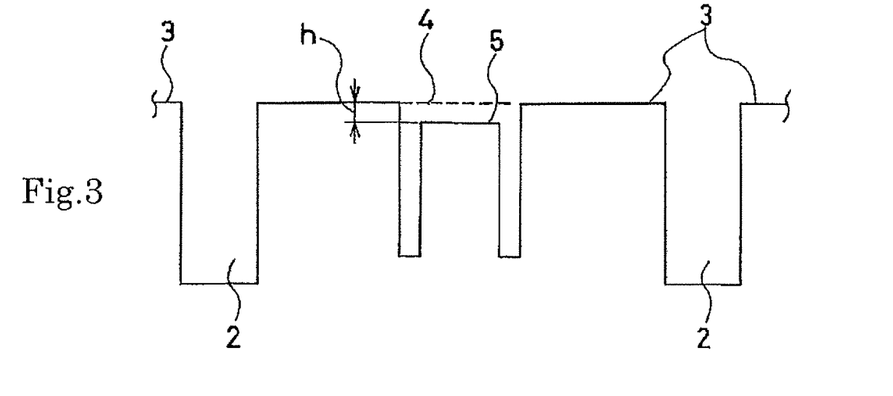
FIG. 3 is a cross-sectional view of the land portion of FIG. 2.

FIGS. 2 and 3 are respectively a perspective view and a cross-sectional view showing a land portion of the shoulder section in an enlarged manner. The small hole 4 is formed in the land portion 3 defined by the lug grooves 2, and the projection 5 is formed inside the small hole 4. The distance between an outer wall of an upper end portion of the projection 5 and an inner wall of the small hole 4 is set to 1 to 5 mm. The distance may be preferably set to 1.5 to 4 mm. If the distance is smaller than 1 mm, the effect of reducing the tread stiffness cannot be obtained. Meanwhile, if the distance is greater than 5 mm, the distance is so wide that the stone retention cannot be prevented.

The height of the projection 5 is set to be lower than the opening of the small hole 4. When the height of the projection 5 is set to be lower than the opening of the small hole 4, i.e., a surface of the tread 1 as described above, chipping of the projection 5 can be suppressed. In addition, when the tire is worn, loss of the projection 5 can be suppressed.

Figure 4:
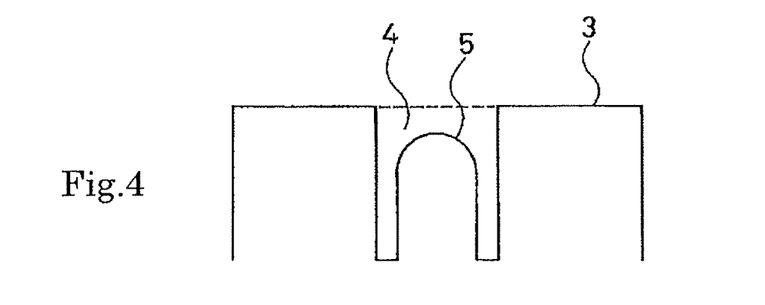
FIG. 4 is a cross-sectional view of a land portion of a pneumatic tire according to another embodiment, and corresponds to FIG. 3.

In addition, the upper end of the projection 5 is formed to have a flat surface as exemplified in FIGS. 2 and 3, or to have a convex surface as exemplified in FIG. 4. When the upper end of the projection 5 has an inwardly concave shape, an outer end portion of an upper end of the projection 5 becomes more likely to be snagged on a road surface. As a result, there arises a problem that chipping is more likely to occur.

The area of an annular portion formed between the outer wall of the upper end portion of the projection 5 and the inner wall of the small hole 4 is preferably set to 3 to 50 mm$^2$. If the area of the annular portion is smaller than 3 mm$^2$, the effect of reducing the tread stiffness cannot be obtained. Meanwhile, if the area exceeds 50 mm$^2$, the area is so wide that small stones can easily enter the annular portion. As a result, the stone retention cannot be prevented.

The depth of the small hole 4 may be 40 to 100% of the maximum depth of the lug grooves 2 formed in the tread 1, and preferably 60 to 100% of the maximum depth of the lug grooves 2. With such a depth, the tread stiffness can be reduced effectively, so that the road noise can be suppressed. Moreover, the effect of suppressing the road noise can be sustained up to the final stage of wear. If the depth of the small hole 4 is shallower than 40% of the depth of the lug grooves 2, the tread stiffness cannot be reduced sufficiently. In addition, since the small hole 4 is soon lost by wearing, the effect of suppressing the road noise cannot be sustained all over the lifetime of the tire.

The vertical depth h from a surface of the land portion 3 to the upper end of the projection 5 may be made to be 1.0 to 5.0 mm, and the vertical depth h is preferably made to be 1.5 to 4.0 mm. If the vertical depth h is smaller than 1.0 mm, chipping occurs in many portions. Meanwhile, if the vertical depth h exceeds 5.0 mm, the stone retention cannot be suppressed.

When the upper end portion of the projection is formed to have a convex surface as shown in FIG. 4, the cross-sectional shape in the radial direction of the tire is preferably a semi-circular outwardly convex shape. When such a semi-circular shape is employed, chipping which occurs when the tire has been worn can be suppressed more effectively than in the case where a flat shape is employed. At this time, the shape of the upper end of the projection 5 may be spherical or semi-cylindrical.

Figure 5:
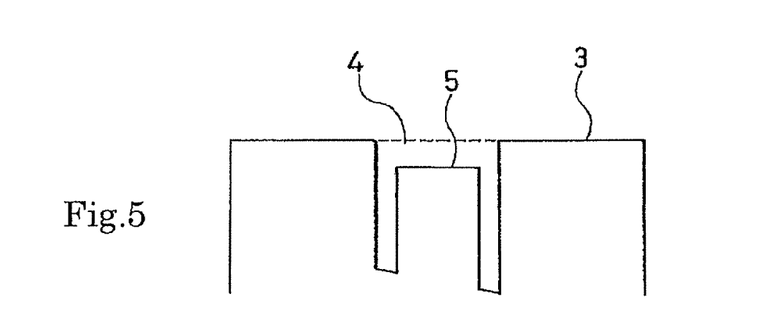
FIG. 5 is a cross-sectional view of a land portion of a pneumatic tire according to yet another embodiment, and corresponds to FIG. 3.

A bottom surface of each small hole 4 may be parallel to the surface of the tread 1, but preferably the bottom surface is inclined as shown in FIG. 5 and is shallower on the outer side in the width direction of the tire (shoulder end portion side) than on the inner side in the width direction of the tire. Since the land portions 3 provided with the small holes 4 are present in the shoulder sections, the condition is such that the shearing motion is greater on outer sides in the width direction of the tire, and wear is more likely occur on the outer sides. In this respect, when the bending stiffness on the outer sides in the width direction of the tire is increased by making each small hole 4 shallower on the outer sides, the durability can be improved.

The lateral cross-sectional shape of each small hole 4 is not particularly limited, but preferably circular or elliptical. When the lateral cross-sectional shape is elliptical, the ratio a/b of the major diameter a to the minor diameter b is preferably $1 < a/b \leq 1.5$. When the lateral cross-sectional shape is circular or elliptical, uneven wear around an edge portion of an opening of the small hole 4 can be suppressed. Note that the small hole 4 and the projection are not necessarily arranged concentrically, but the projection 5 may be eccentric to the small hole 4. Moreover, the small hole 4 and the projection 5 do not necessarily have similar lateral cross-sectional shapes. For example, it is acceptable that the small hole 4 is elliptical, but the projection 5 is circular, or that the small holes 4 is circular, but the projection 5 is elliptical. Even when the shapes are different from each other, the projection 5 may be eccentric to the small hole 4.

Figure 6A:
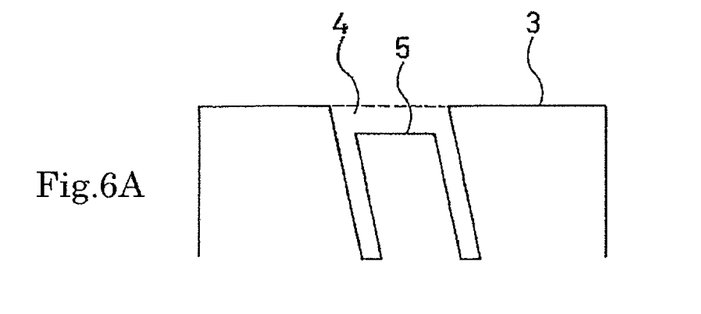
FIGS. 6A to 6C show cross-sectional views of land portions of pneumatic tires according to other embodiments, and the views correspond to FIG. 3.
Figure 6B:
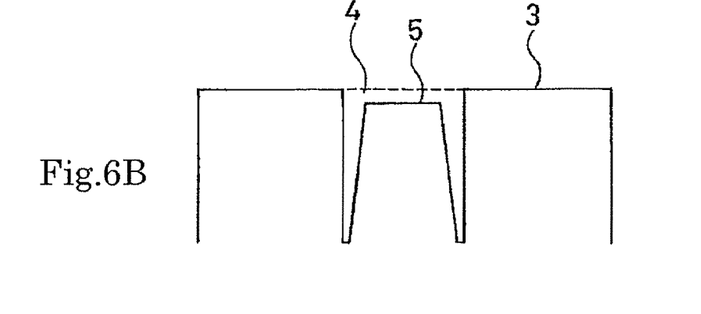
Figure 6C:
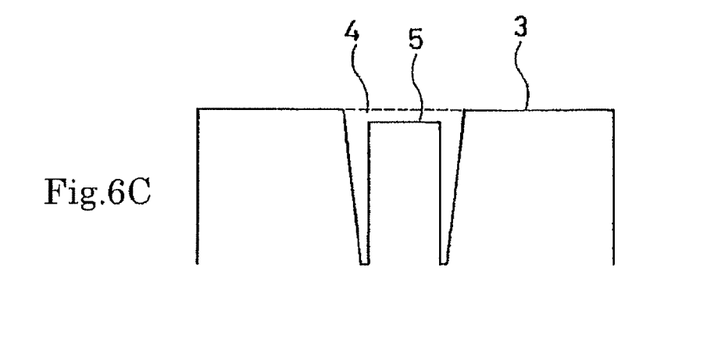

In addition, the small hole 4 and the projection 5 may be formed so that the small hole 4 and the projection 5 can be inclined with respect to the surface of the tread 1 as shown in FIG. 6A. In addition, one of an inner wall surface of the small hole 4 and an outer wall surface of the projection 5 may be perpendicular to the tread 1, and the other one may be inclined with respect to the tread 1 as shown in FIG. 6B or 6C.

Figure 7A:
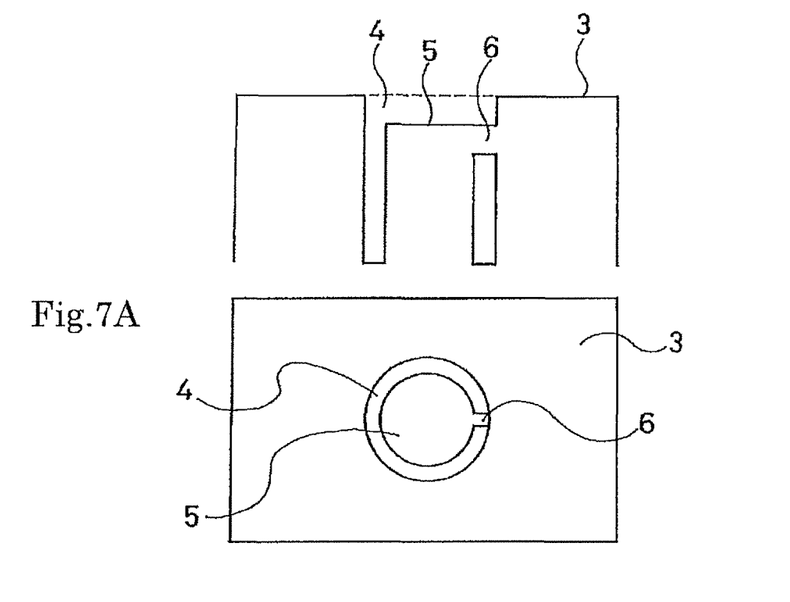
FIGS. 7A and 7B show cross-sectional views and front views of land portions of pneumatic tires according to other embodiments of the present invention, and the cross-sectional views correspond to FIG. 3.
Figure 7B:
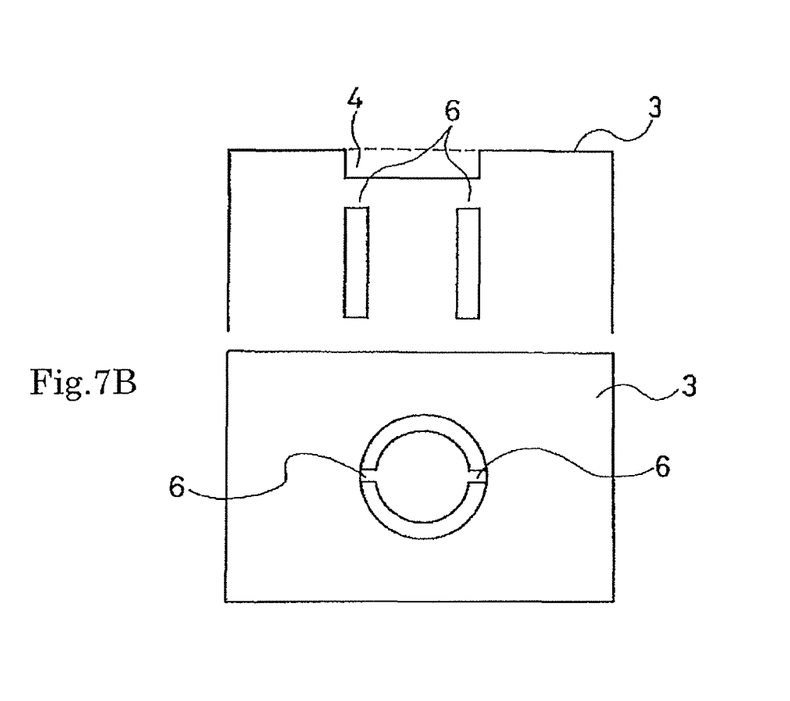

In addition, a connection portion 6 may be provided between the small hole 4 and the projection 5 as shown in FIGS. 7A and 7B so that the small hole 4 and the projection 5 can be partially connected to each other. The connection portion 6 may have any shape, and may be provided at any number of positions. However, it is particularly preferable that the connection portion 6 be provided at an upper portion of the projection 5. At an initial stage of wear, the projection 5 has enough height, and hence easily deforms because of friction with a road surface. In this respect, by connecting the projection 5 to the small hole 4, breakage thereof can be prevented. After the wear proceeds, the height of the projection 5 is reduced, and hence the projection 5 is less likely to deform. For this reason, if the lower portion of the projection 5 is also connected, the stiffness increases so excessively that the effect of suppressing the road noise is reduced. Accordingly, the connection portion 6 is preferably provided to the upper portion of the projection 5, rather than the lower portion thereof.

Figure 8:
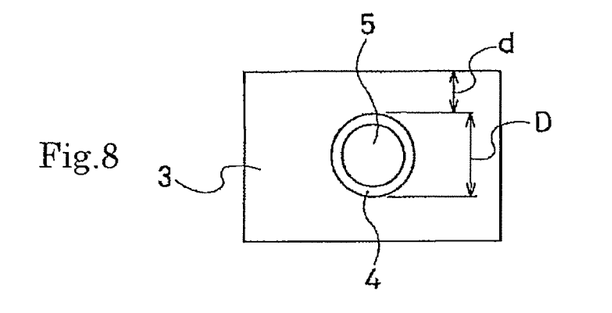
FIG. 8 is a plan view of the land portion of the pneumatic tire of FIG. 2.

FIG. 8 is a plan view of the land portion 3 to which the small hole 4 and the projection 5 are provided. Regarding the position at which the small hole 4 is provided to the land portions 3, the distance d by which an inner edge of the opening is away from an outer lateral edge of the land portions 3 preferably satisfies d≥D/4 with respect to the diameter D of the small hole 4, when the small hole 4 is circular. The provision at this position effectively reduces the stiffness, and enables the suppression of an uneven wear of the land portion 3. Note that, when the small hole 4 is elliptical, d≥b/4 is preferably satisfied with respect to the minor diameter b of the small hole 4.

Figure 9A:
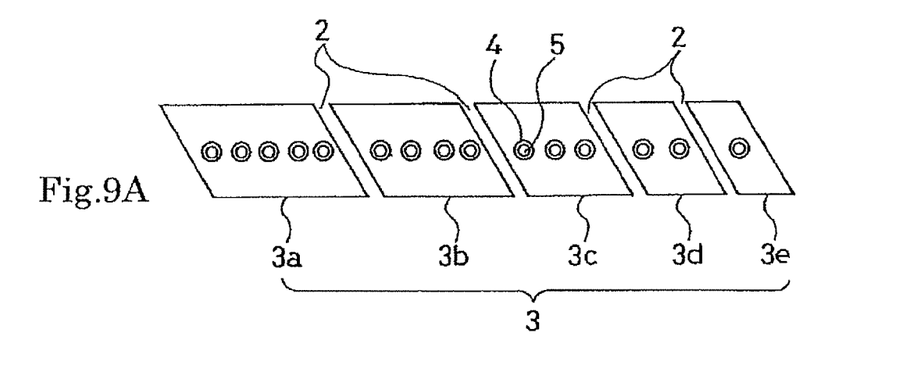
FIGS. 9A and 9B show schematic diagrams of land portions in shoulder sections on treads of pneumatic tires according to other embodiments of the present invention.
Figure 9B:
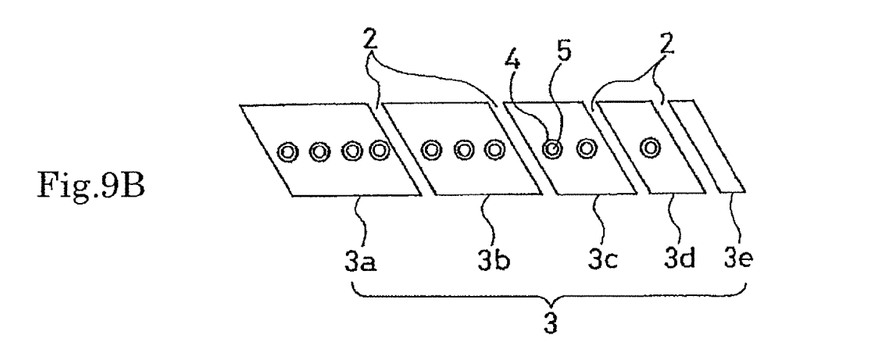

As illustrated in FIGS. 9A and 9B, preferably, the number of the small holes 4 provided per land portion 3 is larger for a land portion 3 having a larger pitch length, while the number of the small holes 4 is smaller for a land portion 3 having a smaller pitch length. It is also possible not to provide the small holes 4 to a land portion 3 having the smallest pitch length.

The stiffness of a land portion 3 is in proportion to the magnitude of the pitch length thereof. Hence, when the number of the small holes 4 is made smaller for a land portion having a smaller pitch length, the rigidities of the land portions can be made approximately uniform. In the example in FIGS. 9A and 9B, the pitch lengths of the land portions 3 are classified into five types. When the land portions 3 are termed 3a, 3b, 3c, 3d, and 3e in descending order of the pitch length, as shown in FIG. 9A, five small holes 4 are provided to a land portion 3a having the largest pitch length, four small holes 4 are provided to a land portion 3b having the second largest pitch length, three small holes 4 are provided to a land portion 3c of the third largest, two small holes 4 are provided to a land portion 3d of the fourth largest, and one small hole 4 is provided to a land portion 3e having the shortest pitch length. In addition, since there may be land portions having no small holes 4 provided thereto as described above, as shown in FIG. 9B, four small holes 4 are provided to a land portion 3a having the largest pitch length, and sequentially, three small holes 4 are provided to 3b, two small holes 4 are provided to 3c, one small hole 4 is provided to 3d, but no small holes 4 are provided to a land portion 3e having the shortest pitch length.

Note that it is only necessary that a land portion having a smaller pitch length should have fewer small holes 4, and a land portion having a larger pitch length should have more small holes 4, as described above. Hence, the magnitude of the pitch length is preferably proportional to the number of the small holes 4. However, the relationship is not limited to the proportional one, but the numbers of the small holes 4 may be the same among land portions having different pitch lengths, for example.

EXAMPLES

Seven kinds of pneumatic tires of Comparative Examples 1 to 3 and Examples 1 to 4 were fabricated. All seven kinds of pneumatic tires commonly had a tire size of 215/60R16 95H, a tread pattern of FIG. 1, and were provided with small holes having a diameter of 5 mm in shoulder sections. Specifications of the small holes and projections were different among the pneumatic tires as shown in Table 1.

Comparative Example 1 is an example where only small holes were provided, but no projections were provided. Comparative Examples 2 and 3 are examples where columnar projections were provided. Comparative Example 2 is an example where the distance between the small hole and the projection was as narrow as 0.5 mm, while Comparative Example 3 is an example where upper ends of the projections were flush with the tread surface. Each of Examples 1 to 4 is an example where projections were provided. Example 1 is an example where columnar projections were provided, the distance between the small hole and the projection were 1.0 mm, and the depth of the small holes was 30% of the maximum groove depth of the lug grooves. Example 2 is an example where columnar projections were provided as in the case of Example 1, but the distance between the small hole and the projection were as wide as 2.5 mm, and the depth of the small holes was as deep as 70% of the maximum groove depth. Example 3 is an example where a tip of each projection was semi-spherical, the distance between the small hole and the projection was 2.5 mm, and the depth of the small holes was 70% of the maximum groove depth of lug grooves. Example 4 is an example where a tip of each projection was semi-spherical as in the case of Example 3, but the distance between the small hole and projection was 3.5 mm, which was the largest, the depth of the small holes was 70% of the maximum groove depth of lug grooves, and the smallest land portions had no small holes provided thereto.

Tires of each of these seven kinds were mounted on a front-engine rear-drive sedan of 3000 cc, and the road noise, the stone retention performance, the wear resistance thereof were determined.

For the road noise, a noise in ⅓ octave and in the 160 Hz band was measured at the right window of the driver's seat in the actual vehicle during the diving at 60 km/h. A smaller measured value indicates that the road noise was more suppressed.

For the stone retention performance, the number of small holes retaining stones was counted for the entire circumference of each tire after the above-described vehicle was driven 1000 km, and then classification was conducted based on the average number of four wheels. Table 1 shows a summary in which a case where the average number was 0 or more and less than 0.5 is rated as good, a case where the average number was 0.5 or more and less than 1.0 is rated as fair, and a case where the average number was 1.0 or more is rated as poor.

For the wear resistance, wear was observed after the above-described vehicle was driven 20,000 km, and then classification was conducted. Table 1 shows a summary in which a case where chipping of the projection was observed is rated as poor, a case where an uneven wear was present around the small hole is rated as fair, and a case where the ware was uniform is rated as good.

TABLE 1

|  |  | Comparative Example 1 | Comparative Example 2 | Comparative Example 3 | Example 1 | Example 2 | Example 3 | Example 4 |
|---|---|---|---|---|---|---|---|---|
| Specification | Presence/absence of projection | Absent | Present | Present | Present | Present | Present | Present |
|  | Small hole-projection distance | — | 0.5 | 1.0 | 1.0 | 2.5 | 2.5 | 3.5 |
|  | Small hole depth (with respect to maximum groove depth) (%) | 30 | 30 | 30 | 30 | 70 | 70 | 70 |
|  | Depth of upper end of projection (mm) | — | 0.5 | 0 | 3.0 | 3.0 | 3.0 | 3.0 |
|  | Annular portion area (mm$^2$) | 20 | 30 | 2 | 2 | 10 | 30 | 45 |
|  | Shape of tip of projection | — | Column | Column | Column | Column | Semi-sphere | Semi-sphere |
|  | Provision of small hole | All pitches | All pitches | All pitches | All pitches | All pitches | All pitches | Except for smallest pitch |
| Evaluation | Road noise (db) | 60.4 | 60.6 | 60.6 | 59.6 | 59.3 | 59.3 | 59.3 |
|  | Stone retention performance | Poor | Fair | Fair | Good | Good | Good | Good |
|  | Wear resistance | Fair | Fair | Poor | Fair | Fair | Good | Good |

What is claimed is:

1. A pneumatic tire comprising:
   a tire center section of a tread surface of the tire;
   a first shoulder section of the tread surface of the tire disposed on a first side of the tire center section with respect to a width direction of the tire; and
   a second shoulder section of the tread surface of the tire disposed on a second side of the tire center section with respect to the width direction of the tire,
   each of the first and second shoulder sections including a plurality of lug grooves extending in the width direction of the tire to define a plurality of land portions, the lug grooves being spaced apart in a circumferential direction of the tire at a variable pitch,
   at least some of the land portions of each of the first and second shoulder sections including at least one hole, the holes being aligned in the circumferential direction of the tire of each of the first and second shoulder sections, respectively,
   each of the holes including a projection formed inside thereof, each of the projections having an upper end with an upper end surface that is positioned lower than an opening of the hole, a shape of the opening of each of the holes being circular or elliptical in a plan view, a shape of each of the projections being circular in a plan view, a shape of the upper end of each of the projections being hemispherical, and a vertical depth from the tread surface of each of the land portions to the upper end surface of a corresponding one of the projections is set within a range from 1.0 to 5.0 mm inclusively,
   each of the holes being configured relative to a corresponding one of the projections formed inside thereof such that a distance between an outer wall of an upper end portion of each of the projections and an inner wall of a corresponding one of the holes is set within a range from 1 to 5 mm inclusively.

2. The pneumatic tire according to claim 1, wherein each of the holes is configured relative to a corresponding one of the projections formed inside thereof such that an annular area formed between the outer wall of the upper end portion of each of the projections and the inner wall of the corresponding one of the holes is set within a range from 10 to 50 mm$^2$ inclusively, and
   each of the holes has a maximum depth that is set within a range from 40 to 100% inclusively of a maximum depth of the lug grooves.

3. The pneumatic tire according to claim 1, wherein a bottom surface of each of the holes is inclined with respect to the tread surface of a corresponding one of the land portions, and is shallower on an outer side in the width direction of the tire than an inner side in the width direction of the tire.

4. The pneumatic tire according to claim 1, wherein each of the openings of the holes that has an elliptical shape in a plan view has a ratio a/b of a major diameter a to a minor diameter b of the elliptical shape satisfying a relationship 1<a/b≤1.5.

5. The pneumatic tire according to claim 1, wherein a distance d by which an inner edge of the opening of each of the holes is away from an outer lateral edge of a corresponding one of the land portions satisfying either a relationship d≥D/4 with respect to a diameter D for each of the openings of the holes having a circular shape, or a relationship d≥b/4 with respect to a minor diameter b for each of the openings of the holes having an elliptical shape.

6. The pneumatic tire according to claim 1, wherein some of the land portions have different pitch lengths with more of the holes being provided in at least one of the land portions having a first pitch length than one of the land portions having a second pitch length that is smaller than the first pitch length.

7. The pneumatic tire according to claim 6, wherein at least one of the land portions is free of the holes having the projections formed inside thereof.

8. The pneumatic tire according to claim 6, wherein
at least one of the land portions has a third pitch length that is longer than the first and second pitch lengths, and has more of the holes the land portions having the first and second pitch lengths.

9. The pneumatic tire according to claim 6, wherein
each of the holes is configured relative to a corresponding one of the projections formed inside thereof such that an annular area formed between the outer wall of the upper end portion of each of the projections and the inner wall of the corresponding one of the holes is set within a range from 3 to 50 mm² inclusively, and
each of the holes has a maximum depth that is set within a range from 40 to 100% inclusively of a maximum depth of the lug grooves.

10. The pneumatic tire according to claim 6, wherein
the upper end portion of each of the projections has a cross-sectional shape in a radial direction of the tire that is semi-circular.

11. The pneumatic tire according to claim 6, wherein
a bottom surface of each of the holes is inclined with respect to the tread surface of a corresponding one of the land portions, and is shallower on an outer side in the width direction of the tire than an inner side in the width direction of the tire.

12. The pneumatic tire according to claim 1, wherein
some of the land portions have more than one of the holes provided thereto such that as the pitch length becomes larger more of the holes provided are thereto.

13. The pneumatic tire according to claim 12, wherein
at least three different pitch lengths of the land portions are provided with at least one of the holes provided thereto.

14. The pneumatic tire according to claim 13, wherein
the land portions of the first shoulder section are asymmetrical with respect to the land portions of the second shoulder section, such that the first and second shoulder sections are non-mirror images of each other with respect to a center longitudinal plane of the pneumatic tire.

15. The pneumatic tire according to claim 13, wherein
the land portions are arranged in a group with the holes increasing sequentially among the group.

16. The pneumatic tire according to claim 15, wherein
at least one of the land portions is free of the holes having the projections formed inside thereof.

17. The pneumatic tire according to claim 1, wherein
either one of an inner wall surface of the hole or an outer wall surface of the projection is perpendicular to the tread, and the other of inner wall surface of the hole or the outer wall surface of the projection is inclined with respect to the tread.

\* \* \* \* \*